(12) United States Patent
Titel et al.

(10) Patent No.: US 8,783,167 B1
(45) Date of Patent: Jul. 22, 2014

(54) CONTROL SYSTEM AND METHOD FOR THERMAL PROCESSING EQUIPMENT

(75) Inventors: Luke A. Titel, Sun Prairie, WI (US); Dennis F. Conohan, Cross Plains, WI (US); Seth T. Pulsfus, Poynette, WI (US)

(73) Assignee: Alkar-Rapidpak-MP Equipment, Inc., Lodi, WI (US)

( * ) Notice: Subject to any disclaimer, the term of this patent is extended or adjusted under 35 U.S.C. 154(b) by 0 days.

(21) Appl. No.: 13/270,966

(22) Filed: Oct. 11, 2011

Related U.S. Application Data

(62) Division of application No. 12/100,792, filed on Apr. 10, 2008, now abandoned.

(60) Provisional application No. 60/911,638, filed on Apr. 13, 2007, provisional application No. 60/982,043, filed on Oct. 23, 2007.

(51) Int. Cl.
*A47J 37/12* (2006.01)

(52) U.S. Cl.
USPC ............................ 99/325; 99/342; 99/421 TP

(58) Field of Classification Search
USPC .......... 99/413, 342, 421 TP, 325; 340/870.17, 340/870.03, 584
See application file for complete search history.

(56) References Cited

U.S. PATENT DOCUMENTS

| | | | | |
|---|---|---|---|---|
| 2,839,409 | A | * | 6/1958 | Matlen ......................... 426/315 |
| 3,908,533 | A | * | 9/1975 | Fagerstrom et al. ............ 99/386 |
| 5,171,974 | A | * | 12/1992 | Koether et al. ................ 219/506 |
| 2006/0254432 | A1 | * | 11/2006 | McLemore ..................... 99/448 |
| 2007/0242559 | A1 | | 10/2007 | Larsen |

OTHER PUBLICATIONS

Webpage Screen Print, ICESPY, website: http://www.icespy.com/applications.food.processing.asp, date accessed Mar. 6, 2007.

* cited by examiner

*Primary Examiner* — Jianying Atkisson
(74) *Attorney, Agent, or Firm* — Andrus Intellectual Property Law, LLP

(57) ABSTRACT

A control system and method that controls the processing, logging, visual display, and product tracking functions for thermal processing equipment includes one or more wireless temperature probes. The wireless temperature probes allow the system to obtain and process real time data information and provide real time control, logging, display and validation for thermal processing. The wireless temperature probes transmit a signal to a receiver through an antenna configured in the thermal processing equipment, and the receiver sends that information to a control panel. The control panel utilizes a graphical user interface with touch screen capabilities, an input/output device, a process and storage media to log and control the process implemented for the food product.

13 Claims, 14 Drawing Sheets

CONTROL SYSTEM AND METHOD FOR THERMAL PROCESSING EQUIPMENT

CROSS REFERENCE TO RELATED APPLICATIONS

The present application is a divisional of co-pending U.S. Utility patent application Ser. No. 12/100,792, filed Apr. 10, 2008, which application is incorporated herein by reference and which application claims priority to Provisional Application Ser. No. 60/911,638, filed on Apr. 13, 2007 and Provisional Application Ser. No. 60/982,043, filed on Oct. 23, 2007.

FIELD OF THE DISCLOSURE

The present application is directed to the field of thermal processing equipment. More specifically, the present application is directed to the field of control systems and methods for thermal processing equipment.

BACKGROUND OF THE DISCLOSURE

In the thermal processing equipment industry, specifically in the food processing equipment industry, batch ovens, conveyor ovens as well as chillers and other such equipment are not configured with wireless temperature probes and systems that are able to control a process flow of the thermal processing device. Current systems utilize wired temperature probes. When a rack with food product is inserted into a batch oven or chiller, it is inconvenient and sometimes impossible to place wired probes exactly where the operator desires. In some cases, it is impossible to utilize these probes at all, such as in a conveyor oven.

In the case of a process flow that requires a number of batch ovens or chillers, the temperature probes in a wired system must be removed prior to moving the racks and food product to a second batch oven or chiller, thus not only being extremely inconvenient for the user, but also rendering it impossible to continuously and accurately record the internal temperature of the product being processed, and thus manage the process flow. Furthermore, the inability to include wired temperature probes in product on conveyor ovens, and the inability to continuously have wired temperature probes on product in batch ovens and chillers requires additional manual monitoring of the process flow.

SUMMARY OF THE DISCLOSURE

A control system and method that controls the processing, logging, visual display, and product tracking functions for thermal processing equipment includes one or more wireless temperature probes. The wireless temperature probes allow the system to obtain and process real time data information and provide real time control, logging, display and validation for thermal processing. The wireless temperature probes of the system and method may be inserted into food product, or attached to a food product rack to track the food product temperature or the ambient temperature of a batch oven, chiller, conveyor oven or other piece of thermal processing equipment. The wireless temperature probes transmit a signal to a receiver through an antenna configured in the thermal processing equipment, and the receiver sends that information to a control panel. The control panel utilizes a graphical user interface with touch screen capabilities, an input/output device, a process and storage media to log and control the process implemented for the food product. The system is useful in conjunction with various thermal processing equipment, including for example, batch ovens, high temperature batch ovens, continuous ovens, air chillers, glycol chillers, and high temperature belt ovens. The system is also useful when utilizing wireless and wired probes in combination.

One aspect of the present invention is a system for controlling thermal processing of food product, the system comprises a thermal processing device configured to process a batch of food product, the batch of food product configured on a plurality of racks in the thermal processing device, wherein the plurality of racks are configured to be removed from the thermal processing device without moving the batch of food product from the plurality of racks; a plurality of wireless temperature probes, wherein the wireless temperature probes are inserted into the batch of food product, and further wherein the wireless temperature probes transmit a signal including the internal temperature of the batch of food product in real time; a first receiver configured to receive the signal from an antenna configured in the thermal processing device wherein the antenna receives the signal from the plurality of wireless temperature probes; and a controller coupled with the receiver, the controller configured to receive the signal from the receiver, log the signal, and control a process flow for the batch of food product in response to the signal in real time. This system further comprises a second thermal processing device configured to receive the plurality of racks and the batch of food product, the second thermal processing device including a second receiver configured in the second thermal processing device and coupled to the controller, wherein the controller includes a graphical user interface and an input/output device configured such that a user can program and select the process flow to be controlled by the controller, further wherein the controller is configured to control the process flow in real time when the batch of food product is in the first thermal processing device, and the second thermal processing device, and while the batch of food product is being transferred from the first to the second thermal processing device. A second controller of the system may be configured to control the process flow of the batch of food product when the batch of food product is being transferred to the second thermal processing device, and when it is in the second thermal processing device. The thermal processing device of the system is any one of an oven for cooking the batch of food product, or a chiller for cooling the food product and wherein the receiver is hardwired to the controller, the signal transmitted by the wireless temperature probes is a radio frequency signal and the wireless probes are also configured to read and transmit an ambient temperature of the thermal processing device. In this system the user can use the GUI to organize and create a set of reports based on the logged signals.

Another aspect of the present disclosure is a method of controlling thermal processing of food product, the method comprises setting a process flow to a first step; reading a set of temperature data with a set of wireless probes; transmitting wirelessly the set of temperature data to a receiver through an antenna; sending the set of temperature data to a control panel; and automatically incrementing the process flow to a next step when the set of temperature data exceeds a predetermined level for the current process step. The method further comprises continuing the first process step when the set of temperature data does not exceed a predetermined level for the current process step and automatically triggering an event when the set of temperature data exceeds a predetermined level for an event trigger wherein a user input is required to end the triggered event. The method further comprises manually moving the set of wireless probes to a different piece of thermal processing equipment when the incremented process step requires a different piece of thermal processing equipment and controlling the movement of the set of wireless probes through a series of processing zones according to whether the set of temperature data exceeds the predetermined level for the current process step wherein a user programming the process flow into the control panel.

Yet another aspect of the present disclosure is a system of controlling thermal processing of food product, the system comprises a storage media for storing a computer application; and a processor coupled to the storage media and configured to execute the computer application, such that when the computer application is executed, the system carries out the following steps: setting a process flow to a first step; reading a set of temperature data with a set of wireless probes; transmitting wirelessly the set of temperature data to a receiver through an antenna; sending the set of temperature data to a control panel; and automatically incrementing the process flow to a next step when the set of temperature data exceeds a predetermined level for the current process step. The steps of this system further comprise continuing the first process step when the set of temperature data does not exceed a predetermined level for the current process step, automatically triggering an event when the set of temperature data exceeds a predetermined level for an event trigger and wherein a user input is required to end the triggered event the user input being effectuated with a graphical user interface. The system further wherein the set of wireless probes is manually moved to a different piece of thermal processing equipment when the incremented process step requires a different piece of thermal processing equipment wherein the steps further comprises controlling the movement of the set of wireless probes through a series of processing zones according to whether the set of temperature data exceeds the predetermined level for the current process step and the steps further comprises taking no further readings when no additional process steps exist. The user may use the graphical user interface to generate a set of reports from the collected set of temperature data.

Another aspect of the present disclosure is a system for controlling thermal processing of food product, the system comprising a thermal processing device configured to process a batch of food product, the batch of food product configured on a conveyor rack in the thermal processing device, wherein the conveyor rack is configured to move the batch of food product through the thermal processing device; a plurality of wireless temperature probes, wherein the wireless temperature probes are inserted into the batch of food product, and further wherein the wireless temperature probes transmit a signal including the internal temperature of the batch of food product in real time; a first receiver configured to receive the signal from the plurality of wireless temperature probes; and a controller coupled with the receiver, the controller configured to receive the signal from the receiver, log the signal, and control a process flow for the batch of food product in response to the signal in real time, wherein controlling the process flow includes controlling the speed of the conveyor rack.

DETAILED DESCRIPTION

Figure 1:
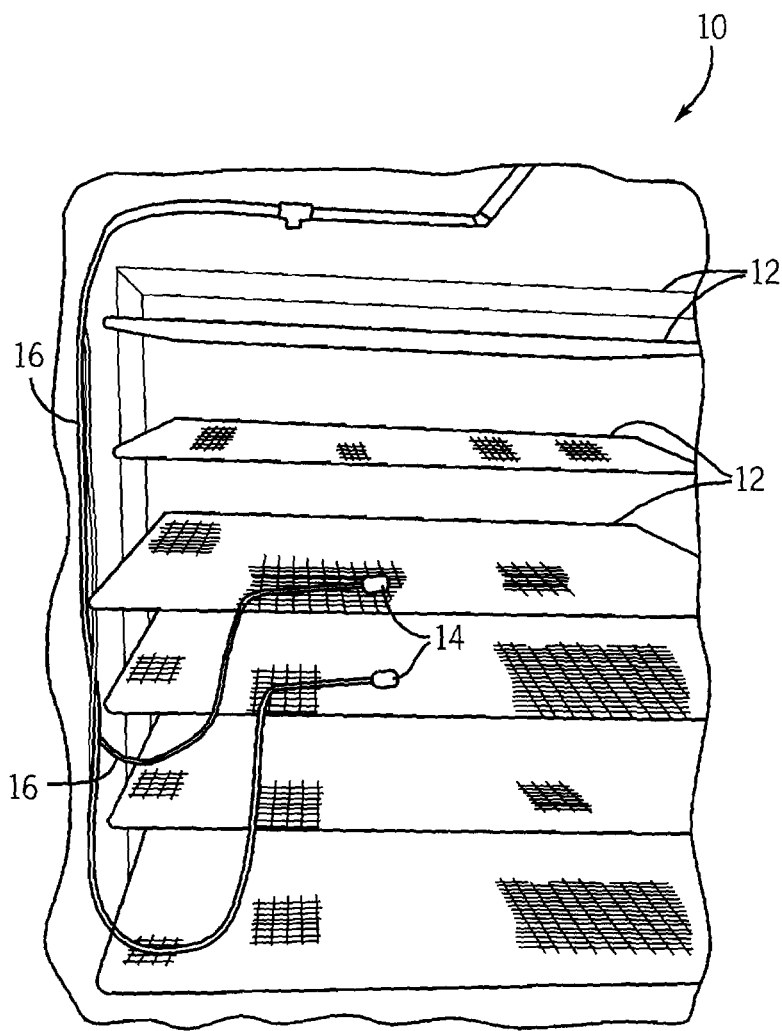
FIG. 1 illustrates a batch oven interior including wired temperature sensors of the prior art.
Figure 2:
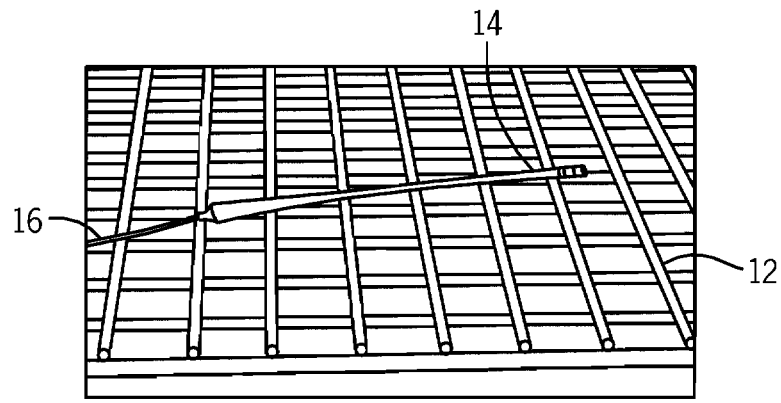
FIG. 2 illustrates a wired temperature sensor of the prior art.

FIGS. 1 and 2 are an illustration of the interior of an exemplary batch oven 10 of the prior art including a product rack 12, a number of wired sensors 14 and the sensor wiring 16. In such a configuration, the wired sensors 14 are inserted into food product (not shown) to be placed on the racks for processing in the batch oven, chiller, or other thermal processing piece of equipment. The wired sensors 14 may also be simply placed on the product rack 12 in order to record ambient temperature throughout the batch oven interior 10. However, because it is desired to insert a number of wired sensors 14 throughout the product on the product rack, as well as numerous ambient wired sensors 14, it is often difficult to place the wired sensors in food product that faces the back of the batch oven interior 10 or simply very close to a wall of the batch oven interior 10. Furthermore, it is difficult to attach a probe to the center of the product rack. This inconvenience forces manufacturers to lengthen the sensor wiring 16 such that the wired sensors 14 be placed in the appropriate temperature collection areas, including into the food product, prior to pushing the product rack 12 into the batch oven interior 10.

Still referring to FIGS. 1 and 2, this configuration is also problematic in that when particular products have a process flow that includes thermal processing in more than one piece of thermal processing equipment, the wired sensors 14 must either be removed from the food product and the rack, or the sensor wiring 16 must be disconnected from the batch oven interior 10. This problem reduces the efficiency of the process flow, and further does not allow the operator of the thermal processing equipment to fully monitor the product being processed in real time. Furthermore, wireless probes may have a high reliability and more durable than the wired variety.

Figure 3:
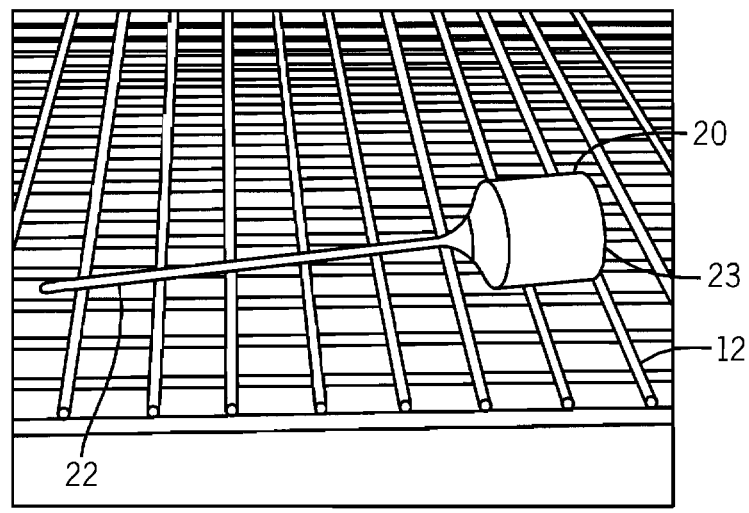
FIG. 3 illustrates a wireless temperature sensor of an embodiment of the present application.

FIG. 3 is a wireless sensor 20 of an embodiment of the present application, configured as an ambient temperature collector on a product rack 12. The inserting end 22 of the wireless sensor 20 is configured to be inserted into the food product being processed on the product rack, and the transmitting end 23 is configured to transmit thermal data to a receiver (not shown) with an RF signal, or any other transmission protocol capable in the art. It should be noted that this is an exemplary wireless sensor, and that other wireless sensors having similar or different configurations may be used as long as they are capable of reading the internal temperature of food product and transmitting the same wirelessly to a receiver.

Figure 4:
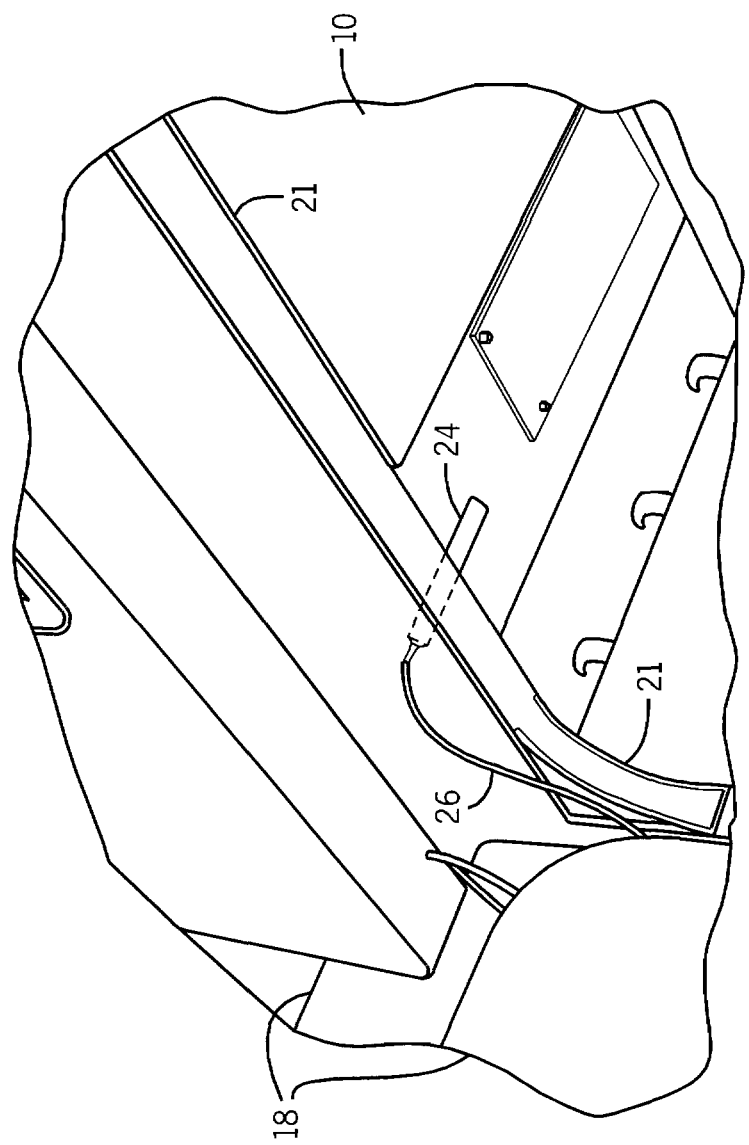
FIG. 4 illustrates a batch oven interior according to an embodiment of the present application.

FIG. 4 illustrates an antenna 24 according to an embodiment of the present application. Here, a portion of the batch oven interior 10 is depicted as the batch oven door 18 is shown open to reveal a batch oven door jam 21 and the batch oven interior 10. It should be noted, in the aforementioned descriptions and the following descriptions as well, that while a batch oven is being used for thermal processing, it is understood that the antenna, wireless sensors, transmitters, receivers and overall system are implemented in other thermal processing devices as well. For ease of description, a batch oven is being used to illustrate how the antenna, wireless sensors, transmitters and receivers function within the system. Referring back now to FIG. 4, the antenna 24 is configured such that the end of the antenna 24 is protruding into the batch oven interior 10 and is installed through the door jam 21 and connected via the receiver wiring 26 to a receiver that communicates with the control panel (not shown). Of course, the antenna 24 may be installed in any portion of the door jam, and further may be installed in any other wall of the batch oven within close proximity to the wireless sensors 20 and/or the receiver/control panel (not shown). Also, it is contemplated that the antenna 24 may be installed entirely outside of the batch oven interior 10 depending upon the strength of the wireless sensor transmission signal, and the ability of the antenna 24 to detect the same.

The antenna 24 transmits the signal from the sensor to a receiver (not shown). The receiver may be wireless or wired to the antenna 24, and the entire system may include one or a plurality of receivers, depending upon the requirements of the particular system. One receiver may be configured to receive signals from a number of antennas 24, configured in one or a plurality of ovens. Again, as discussed above, it is further contemplated that while the embodiment described above includes only wireless sensors, it is possible for an embodiment to include an oven that functions with both wired and wireless sensors.

Figure 5:
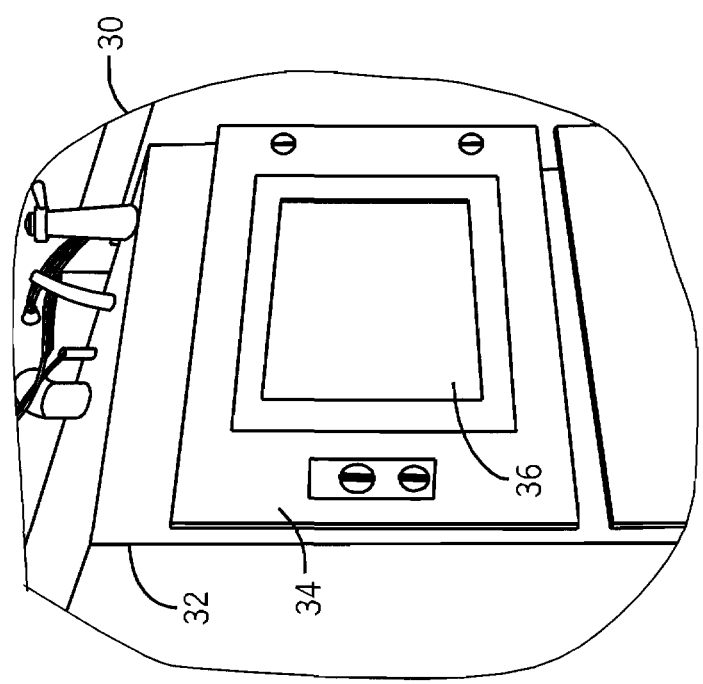
FIG. 5 illustrates a control panel of an embodiment of the present application.

Referring now to FIG. 5, a control panel 30 of the present application is graphically represented. Here, the control panel 30 includes a control panel housing 32, a graphical user interface (GUI) 36, and a set of switches/alarms. The switches/alarms 34 can be specially configured according to the needs of the control panel and the thermal processing equipment that the control panel 30 is controlling. Such switches/alarms 34 may include power switches, lights, alarms, gauges, etc. As will be shown later, the control panel housing 32 is customarily constructed of the same material as the batch oven, or thermal processing equipment, and is directly mounted to the same. However, other embodiments may include a stand alone control panel housing 32.

Figure 6:
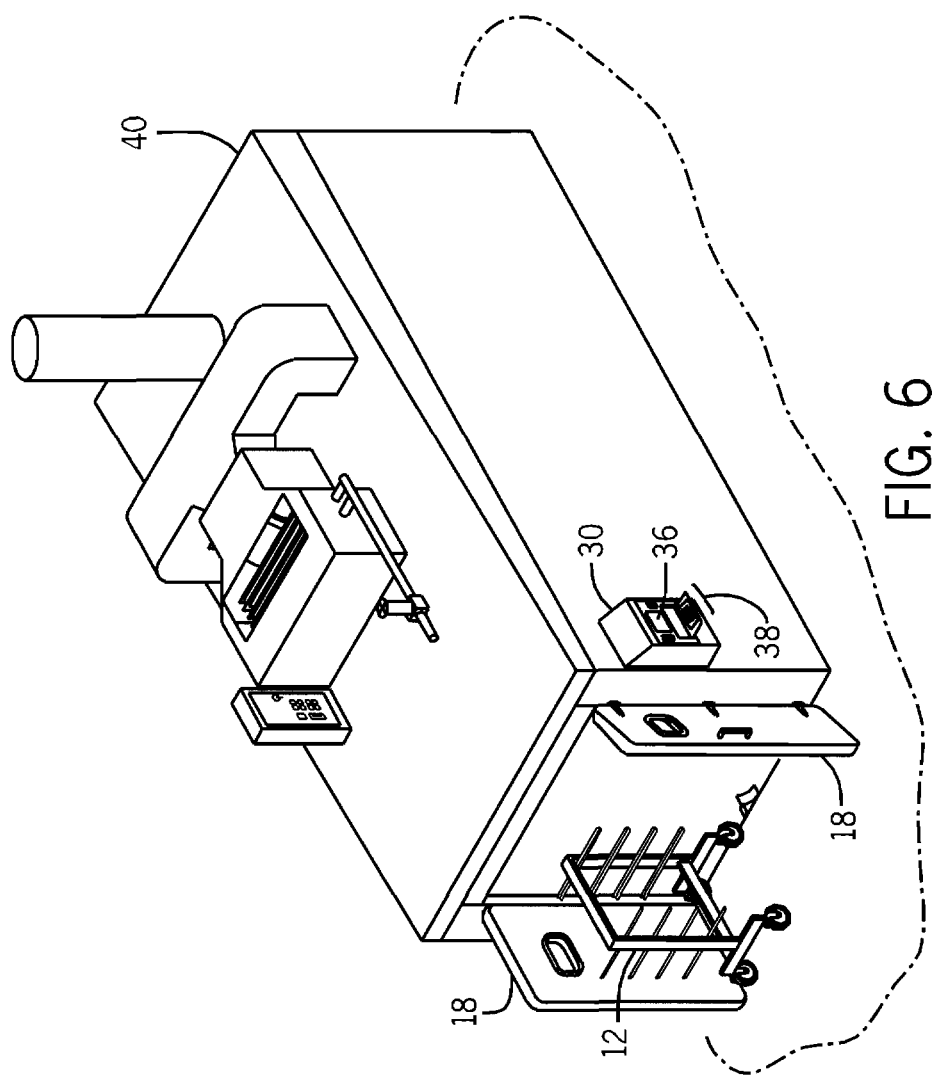
FIG. 6 illustrates a batch oven according to an embodiment of the present application.

FIG. 6 illustrates a batch oven 40 according to an embodiment of the present application. As stated previously, it should be understood that while a batch oven 40 is being used to illustrate the functionality of an embodiment of the system of the present application, that other thermal processing equipment such as chillers, conveyers, etc., may be utilized accordingly. Referring back to FIG. 6, here the product rack 12 is configurable to include product for processing and a plurality of wireless sensors (not shown). The batch oven 40 further includes a control panel 30, having a GUI 36, and in this embodiment, an input/output device 38. A user of this batch oven is able to control the thermal processing of the product on the product rack by utilizing the GUI 36 and the input/output device 38 of the control panel 30. As stated previously, the control panel 30, and other embodiments, may stand alone away from the batch oven 40, or at some other location possibly central to other thermal processing equipment being used in any given process. Here, once the product rack 12 is placed in the batch oven 40 with product for processing and the wireless sensors, the batch oven doors 18 are closed and the process is started.

Still referring to FIG. 6, once the batch oven doors 18 of the batch oven 40 are closed and the process is started by a user with the control panel 30, the user is able to control the process at the control panel 30 and be provided with real time temperature data, logging, and automatic control of the process flow as the wireless sensors 20 are automatically sending readings from the product and the ambient batch oven 40 temperature to the control panel 30 through the receiver and antenna 24 (FIG. 4). According to the process flow, a user of this system may be prompted to remove the product rack 12 with the product and wireless sensors 20, and transfer the product rack 12 to another thermal processing piece of equipment such as a chiller, or other known device. The control panel 30 may continue to be utilized to monitor the process for that specific product rack 12, or in other embodiments, another control panel 30 (not shown) may be mounted on the second thermal processing device and be configured to run the same process flow.

Figure 7:
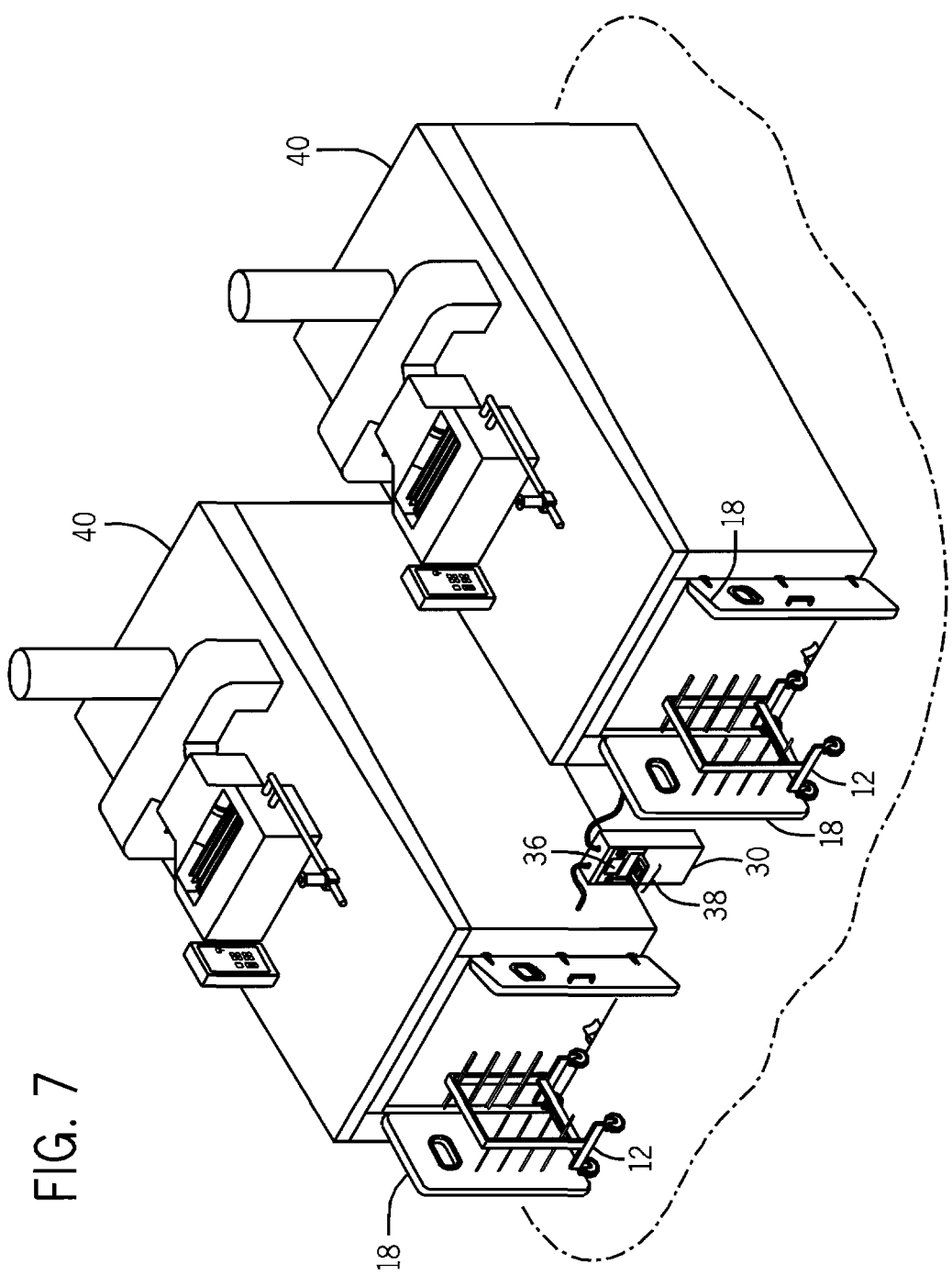
FIG. 7 illustrates a system including two batch ovens according to an embodiment of the present application.

Referring now to FIG. 7, another system of the present application including two batch ovens 40 is depicted. Here, both of the thermal processing units are batch ovens 40, but as stated previously, could be other thermal processing equipment. Both batch ovens 40 have batch oven doors 18 and are configured to receive a product rack 12 with product and wireless sensors (not shown). In this embodiment, a single control panel 30 is wired to both of the batch ovens 40, and is configured to control the process flow for a product rack 12 that is transferred from one batch oven 40 to another. The control panel 30 may obtain the temperature signals by way of the receiver or receivers (not shown) used to receive the data from the antennas 24 (FIG. 4) in the batch ovens 40. A user, using the input/output device 38 and the GUI 36 of the control panel 30, may monitor in real time the temperature and process flow of product on either one of the product racks 12 while they are being thermally processed in one of the batch ovens 40. The GUI 36 and the input/output device 38 may also be used by the user to program a process flow, which will be discussed later. Upon the process flow requiring the product rack 12 to be moved from one piece of thermal processing equipment to another, the product rack 12 is manually removed from one of the batch ovens 40 and placed in the other. During this manual transfer of the product rack from one batch oven 40 to another, the control panel 30 continuously monitors, logs, and controls the process flow for that product rack 12.

Figure 8:
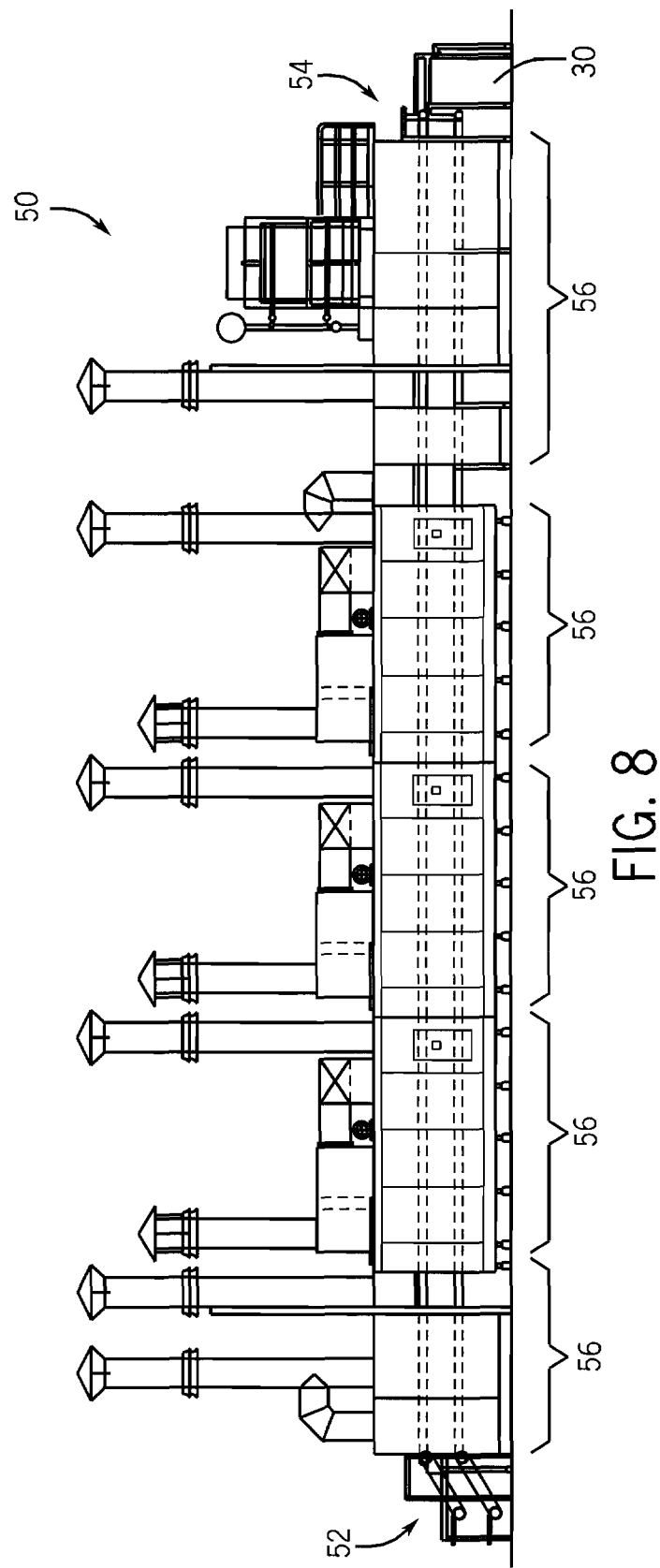
FIG. 8 illustrates a conveyor oven according to an embodiment of the present application.

Referring to FIG. 8, a conveyor oven 50 implementing an embodiment of the system of the present application is depicted. Here, the conveyor oven 50 includes an intake 52 wherein food product is placed on a conveyor belt or a conveyor rack and moved through a number of processing zones 56 of the conveyor oven 50 to an outtake 54, wherein the food product is removed and packaged. Typically, the conveyor oven 50 includes a plurality of different processing zones 56 that carry out various thermal processing stages for the food product moving through the conveyor oven 50. Also typically, the conveyor oven 50 is a complete single process for any given food product. The conveyor oven 50 of the present application is also configured to include a control panel 30. It should be noted that the control panel 30 may be implemented on the conveyor 50 wherever convenient and appropriate, and can even stand alone as was depicted in previous embodiments. Also, in operation, the wireless sensors (not shown) are inserted into the food product prior to the food product being loaded in the intake 52. Also, multiple antennas and receivers (not shown) may be installed throughout the conveyor oven 50, and even corresponding to each of the processing zones 56 if needed.

As the food product moves through the conveyor oven 50 and passes through each of the various processing zones 56, the temperature of the food product is wirelessly transmitted to the antennas, and then to the receivers, and then to the control panel 30, thus providing a means for the control panel to monitor the temperature of the food product as it travels through the conveyor oven. Furthermore, as the control panel 30 receives temperature data from the wireless sensors in the food product, the control panel runs the process flow for the food product being processed, and is able to control the speed of the conveyor in order to carry out the process flow in the food product. The control panel is further configured to sound an alarm to alert the user of any temperature deviation.

For example, if the first processing zone is configured to cook the food product to a threshold temperature, and it is found that the food product has not reached the threshold temperature by the time it reaches the end of the first processing zone 56, then the control panel 30 may slow down or stop the conveyor such that the food product is cooked to the appropriate threshold temperature before moving it to the next processing zone 56, while alerting the user with an alarm. Of course, this methodology may be implemented in the chilling, showering, or any other thermal processing zone 56 configured in the conveyor oven 50.

Figure 9:
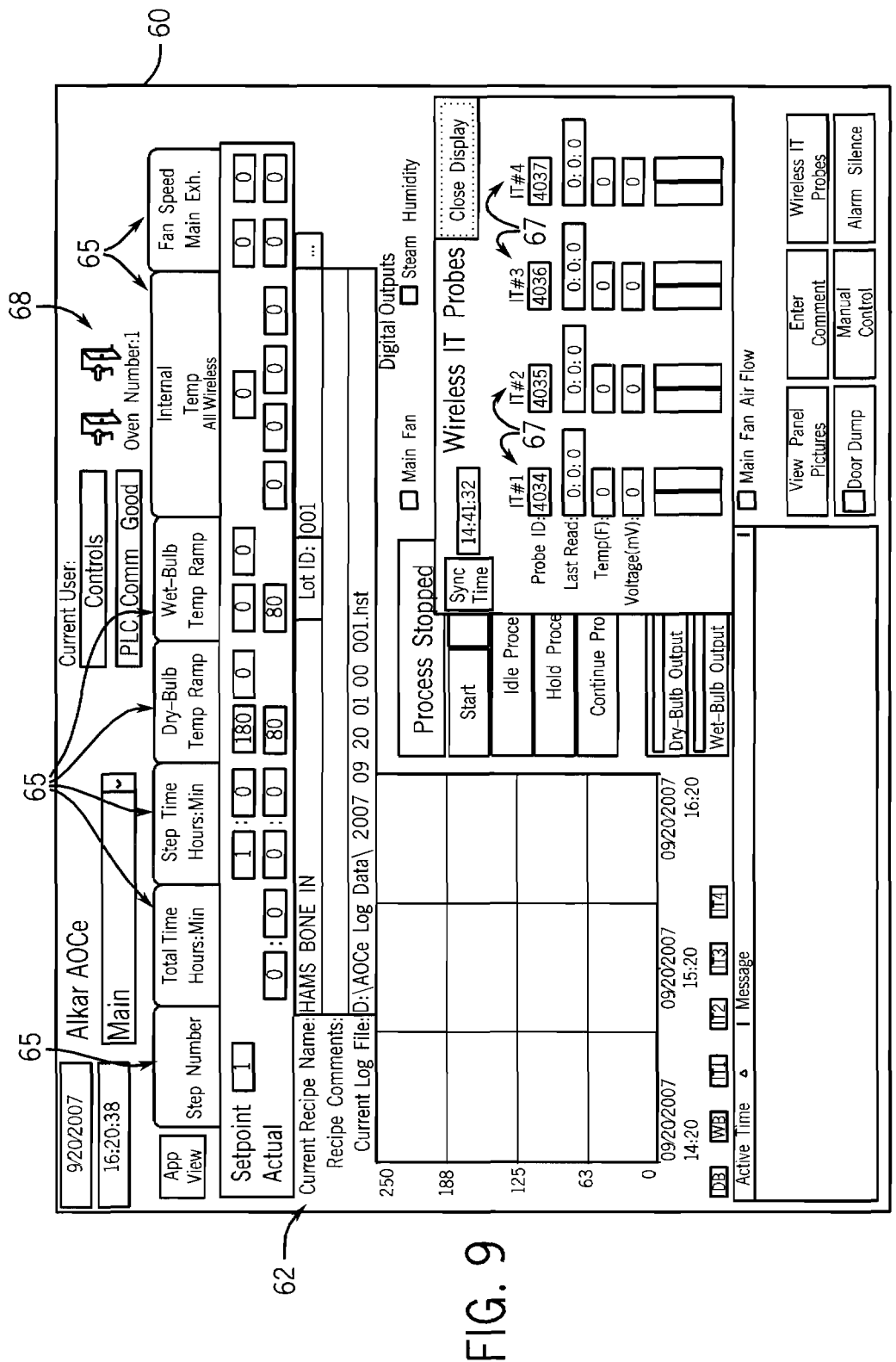
FIGS. 9-12 are screen shots of a number of process control screens of an embodiment of a graphical user interface (GUI) of the present application.
Figure 10:
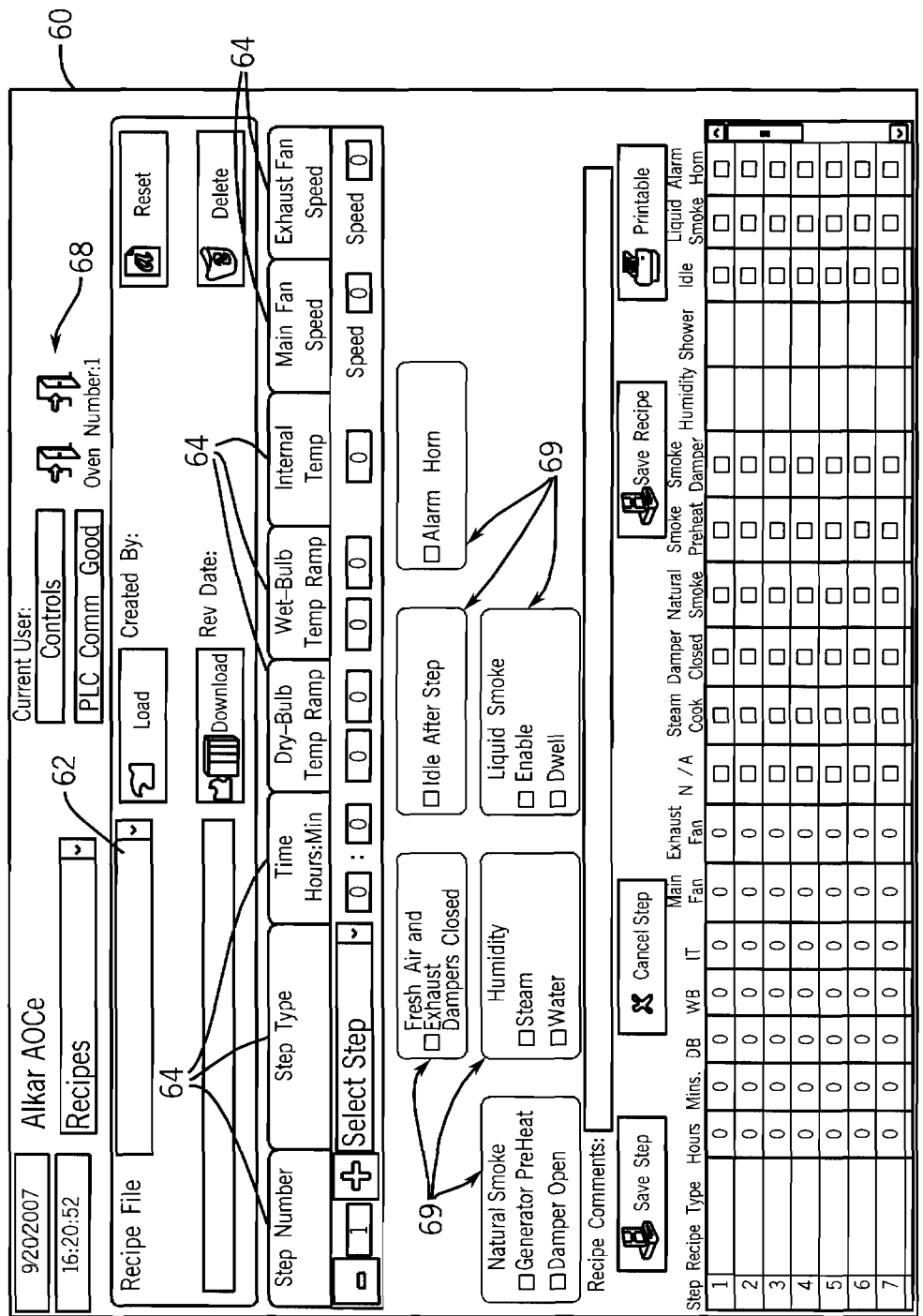

Referring to FIGS. 9-12, a number of control screens 60 that are utilized in the graphical user interface 36 (not shown) are illustrated. It should be noted that these control screens 60 are exemplary, and that additional control screen 60 are used for different functions in the system, but these control screens that are depicted in FIGS. 9-12 have been utilized to illustrate the programming and facilitation of the process flow through the control panel 30 (not shown). Referring first to FIG. 10, the control screen 60 includes an oven number indicator 68 to illustrate and select what oven is being currently configured by the user. This particular control screen 60 of FIG. 10, is usually referred to as the "recipes" control screen 60, thereby allowing a user to utilize the threshold entry tabs 64 to program the process flow by entering a number of steps, the type of steps, a time in hours and minutes that the step may occur, a dry bulb temp, a wet bulb temp, an internal temp of the food product batch, a main fan speed or an exhaust fan speed (from left to right of the tabs marks "64") for each process flow.

The user, utilizing the graphical user interface 36, may define a number of processing steps for the food product utilizing any of these threshold entry tabs 64. For instance, step one may simply be a one hour cooking step, that requires an internal temperature of 350° F. In this case, the user would enter step number one, the step type as a cooking step, one hour as the time, and under internal temp a value of 350° F. Please note that this is merely an example, and should in no way limit the claims of the invention. Utilizing the event entry boxes 69, a user may also designate whether a particular step should include an alarm horn, liquid smoke, idle after step, closing of the fresh air and exhaust dampers, a humidity factor, or natural smoke. It should also be noted that either the threshold entry tabs, or the event entry boxes 69 may be specially configured for a user's particular system and processing devices. Lastly, the recipe box 62 allows the user to save the "recipe" file that is created through this control screen 60 by setting a number of steps for the process flow.

Referring now to FIG. 9, this control screen 60 is referred to as the "main" screen. In this control screen 60, the threshold display tab 65 displays the current step number of the current recipe process flow. Again the recipe box 62 lists the current recipe of the process flow being carried out. The threshold display tabs 65 show the settings for each step, as designated in the previous discussion with respect to the "recipe" control screen 60. Again, the oven number indicator 68 illustrates which oven is being monitored and controlled. Lastly, with respect to FIG. 9, the wireless sensor display 67 shows an ID number, time of last reading, a temperature and a voltage for each of the wireless temperature probes that the process flow is currently monitoring.

Figure 11:
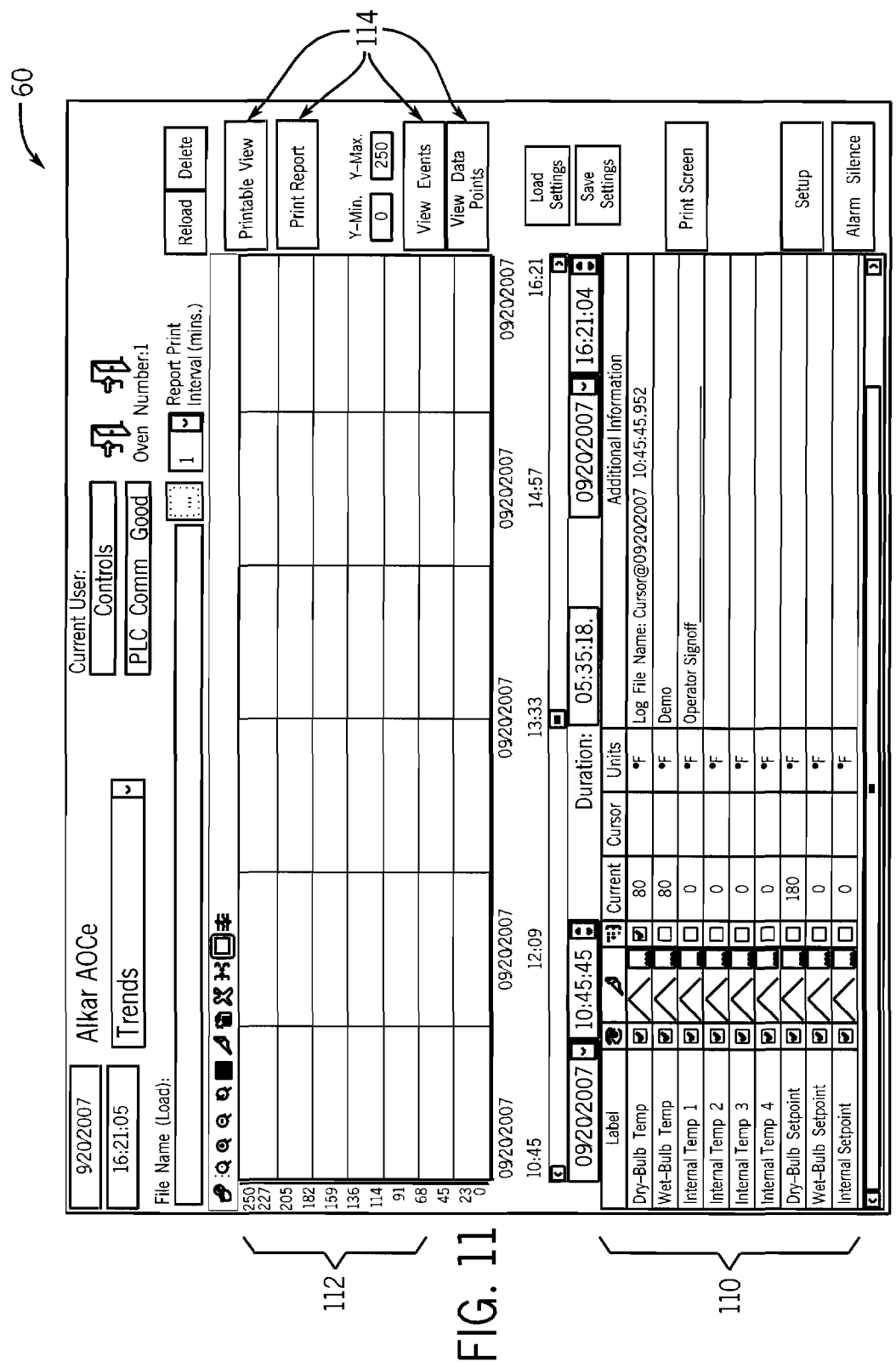

Referring to FIG. 11, a "trends" control screen 60 is illustrated. This control screen 60 includes a data graph 112 configured to graph in realtime temperature readings from the wireless sensors, and a data selector 110 configured such that a user may select which variables to graph in the data graph 112. For instance, not only may a user select the internal temperature variables from the wireless sensors, but a user may also decide to graph the dry bulb temp, wet bulb temp, the dry bulb set point, the wet bulb set point or the internal set point. Again, this data selector 110 area may be specially configured to the particular oven or system being utilized. Lastly, a set of action buttons 114 is included in this control screen 60 so that a user may view events, view data points, or print the data as graphed in the data graph 112.

Figure 12:
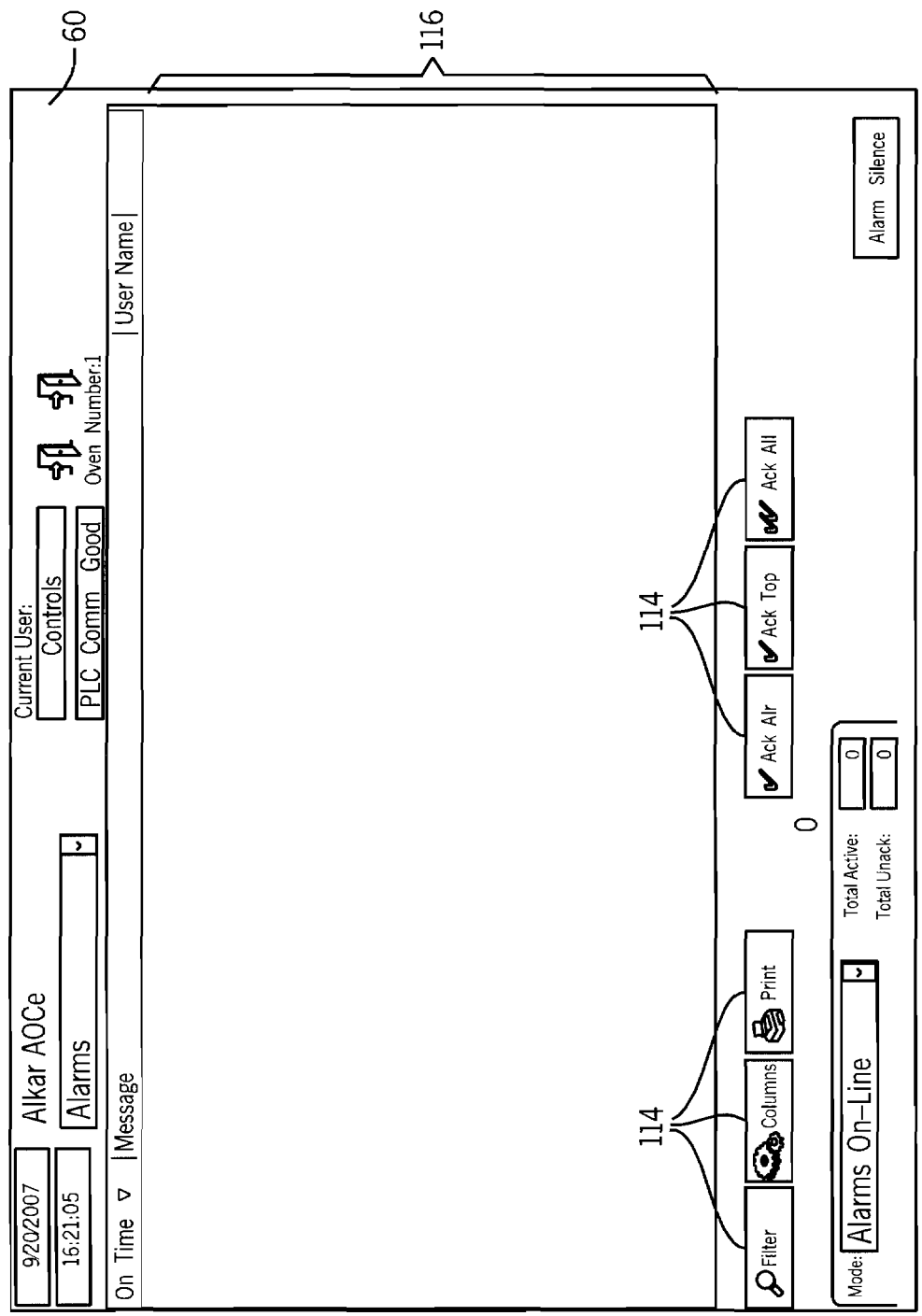

Referring to FIG. 12, an "alarms" screen control screen 60 is depicted. Here, any alarms that occur in response to the process flow are listed in an alarm list 116. One example of an available alarm includes a real time low battery signal strength alarm. In this particular figure, no alarms are listed at the present moment, but when alarms are present a user may navigate, organize, and print the alarms that have occurred utilizing again the action buttons 114. Once again, these action buttons 114 are configurable by user to be tailored to the particular system and/or oven.

Figure 13A:
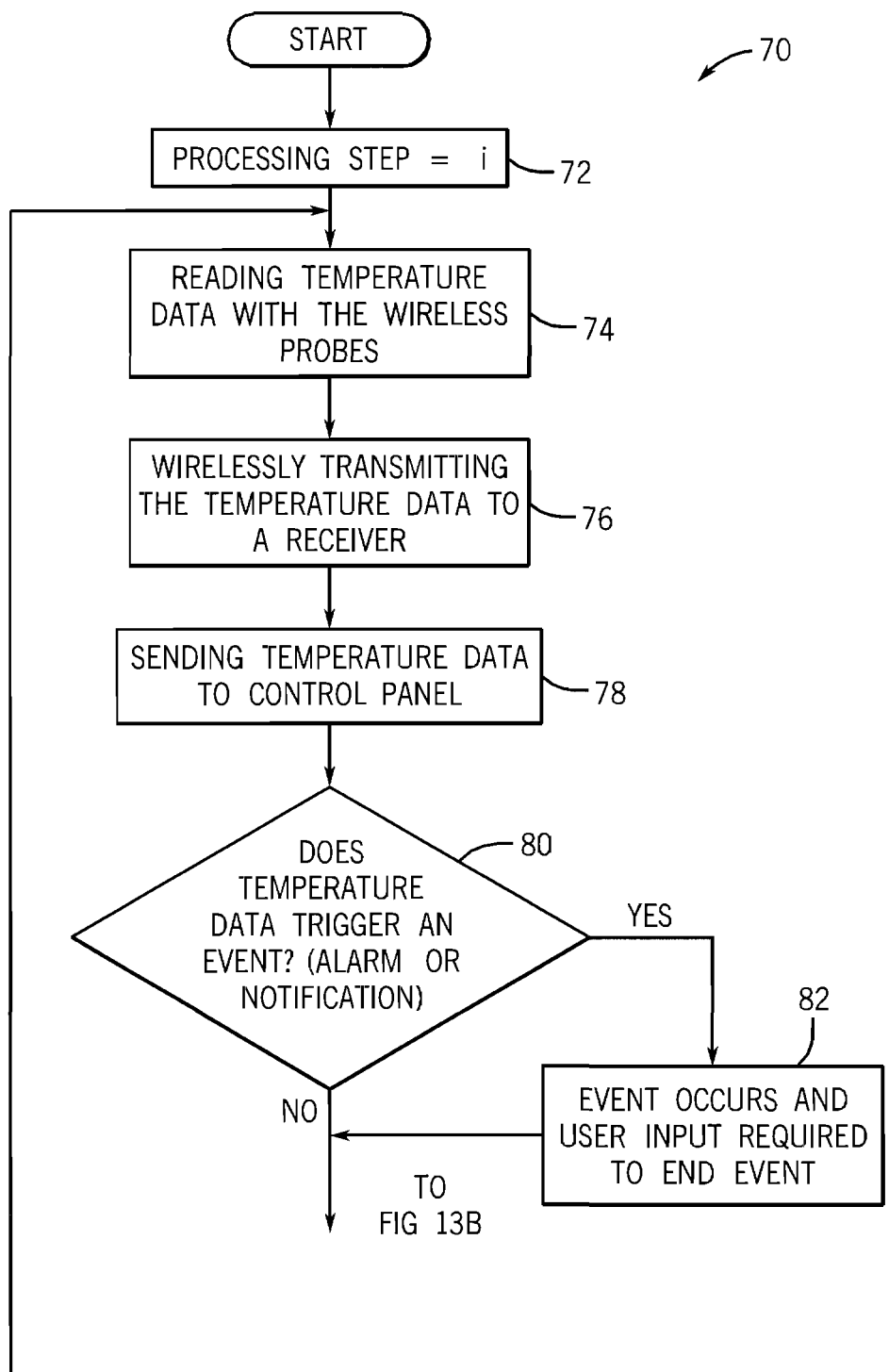
FIG. 13 is a flow chart of an embodiment of a method of the present application.
Figure 13B:
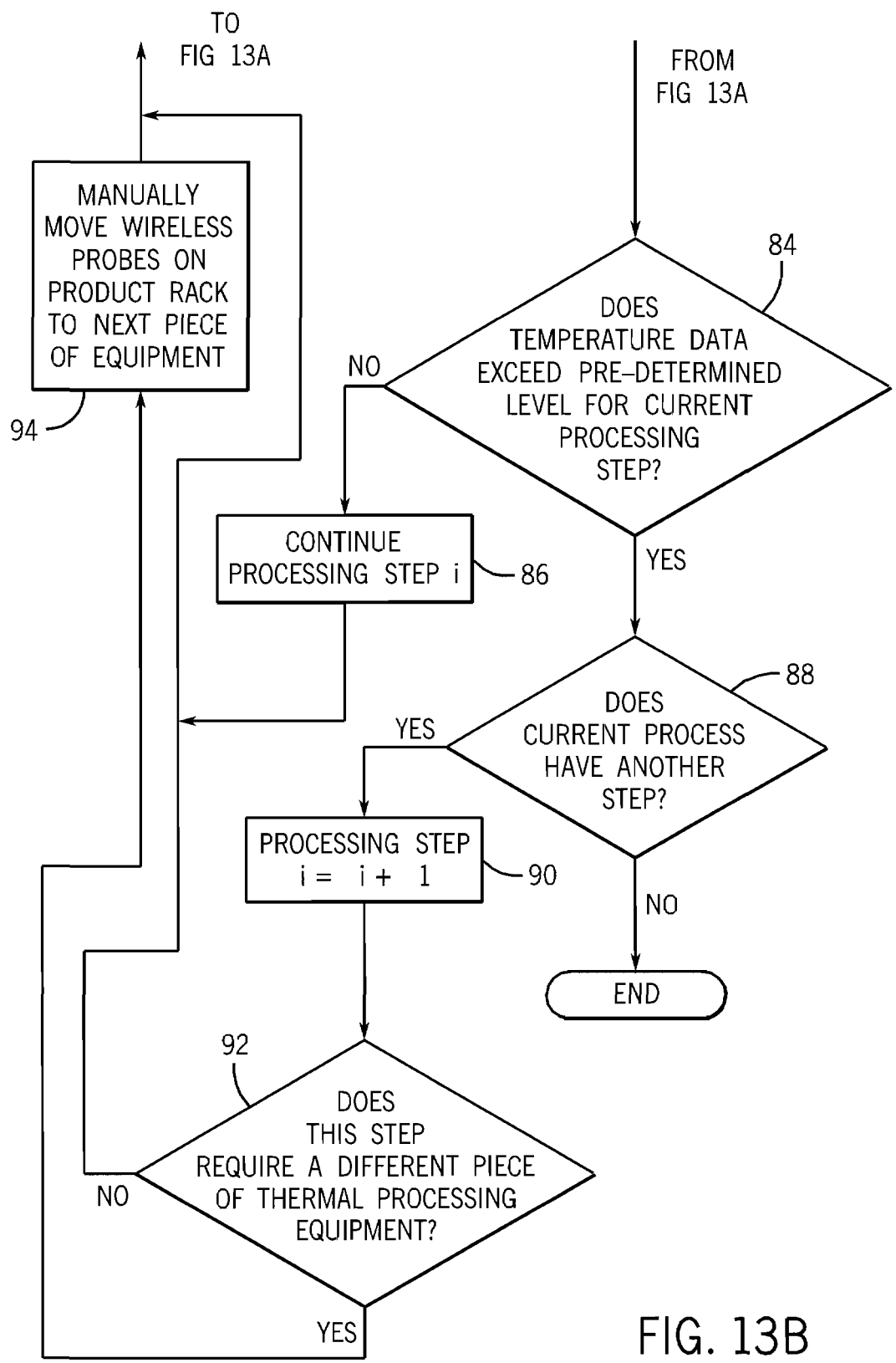

Referring now to FIG. 13, a method of the present application is depicted in a flow chart. In step 72, a processing step is set to the particular step number that the user wishes to begin with for a particular process flow. In step 74, the temperature data is read from the wireless probes, and in step 76 the wireless probes transmit the temperature data to a receiver through the internal antenna. In turn, in step 78, the receiver sends the temperature data to the control panel. If the temperature data received by the control panel triggers an event, e.g. an alarm or notification, then the event occurs in step 82 and user input is required to end that event. Furthermore, the event will be recorded and logged as described previously. If the temperature data does not trigger such an event, then it is determined in step 84 whether the temperature data exceeds a predetermined level for the current processing step. Once again, how these predetermined levels for current processing steps are determined has been described previously in the user's ability to set thresholds for each step of the process with the threshold entry tab 64. If the temperature data does not exceed the predetermined level for the current processing step, then the processing step continues in step 86 and further onto step 74.

Still referring to FIG. 13, if the temperature data does exceed a predetermined level for the current processing step in step 84, then in step 88, it is determined whether the current process has another step, as defined and entered by a user with the threshold entry tabs as discussed above. If there are no further steps, then the method ends. If there is another process step, then in step 90 the processing step is incremented by one, and it is determined in step 92 whether the new step requires a different piece of thermal processing. If the new step does not require a different piece of thermal processing equipment then the method continues back to step 74. If the new step does require a different piece of thermal processing equipment, then the wireless probes configured in the food product are manually moved to the next piece of equipment and the method continues in step 74.

It should be noted that in the case of conveyor ovens, after the processing step is incremented in step 90, that the food product with the wireless sensors may not be moved to a different piece of thermal processing equipment. In the case of a conveyor oven, the conveyor will move the food product and wireless sensors into the next processing zone of the conveyor oven. This step would replace steps 92 and 94 as written in FIG. 13, and then continue to step 74 of the method. Furthermore, in the case of conveyor ovens, in step 84, if the temperature data does not exceed the predetermined level for the current processing step, then the conveyor must slow down or stop the food product with the wireless sensors before continuing with the process step, and further restart the conveyor once the temperature data does exceed a predetermined level for the current processing step.

Figure 14:
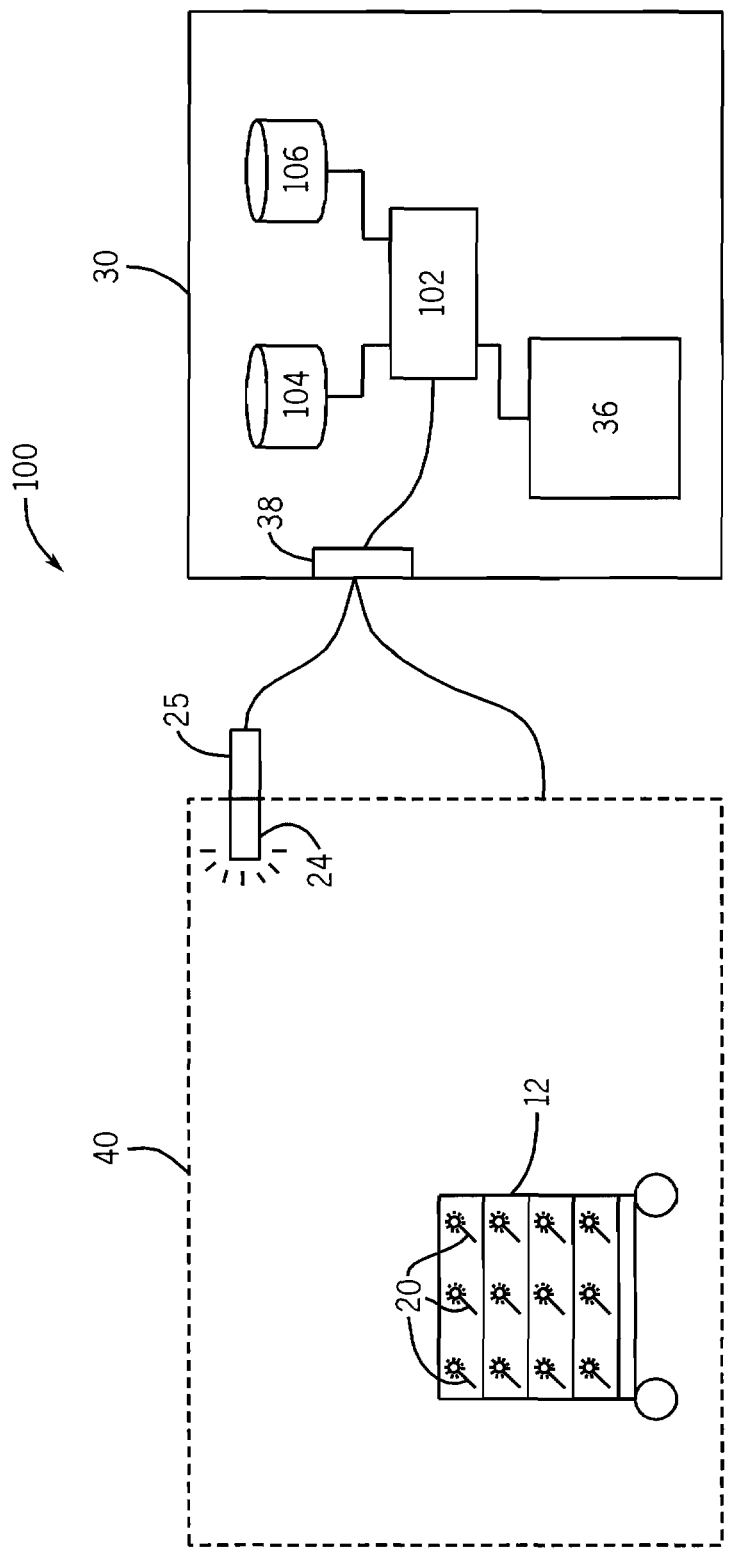
FIG. 14 is a block diagram illustrating of an embodiment of a system of the present application.

Referring now to FIG. 14, a control system 100 of the present application is depicted in block diagram. Here, a control panel 30 and a batch oven 40 are configured such that an antenna 24 receives wireless signals from a plurality of wireless sensors configured to read the internal temperature of food product (not shown) or the ambient temperature of the batch oven 40. Again, it should be noted that the single batch oven 40 configuration of this particular figure is exemplary only, and the further embodiments described in the specification may be include, for example multiple batch ovens, other processing devices such as chillers, or continuous ovens. Still referring to FIG. 14, the control panel 30 includes a graphical user interface 36, an input/output device 38, and further includes a processor 102, a storage medium 104 and a database 106. As the receiver 25 receives data from the antenna 24, that data is transferred to the processor 102 through the input/output device 38. The processor 102 is configured to execute a set of commands embodied in a software application that is stored in the storage medium 104. When executed by the processor 102, the software application stored in the storage medium 104 executes the method as described previously in FIG. 13. The executed method receives the signals from the receiver 25, and further receives interaction from the user through the GUI 36. The input/output device 38 is configured to also send signals to the oven in response to user entry and other signals from the processor 102. Furthermore, the data collected by the wireless sensors, may be stored in the database 106. Again, it should be noted that the configuration of the control panel 30 may be adjusted to particular suit the needs of the user. It should also be noted that such a control panel may include additional storage medium or databases as the needs of the system dictate.

The present invention has been described in terms of specific embodiments incorporating details to facilitate the understanding of the principals of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A computerized method of controlling thermal processing of food product effectuated by a processor executing a set of commands stored in a storage medium, the method comprising:
   setting a multi-step process flow to a first food processing step that is conducted automatically by the set of commands in a first thermal processing device;
   reading, with a set of wireless probes inserted in the food product, a temperature characteristic of the food product in the first thermal processing device;
   wirelessly transmitting the temperature characteristic from the wireless probes to a receiver;
   communicating the temperature characteristic from the receiver to a control panel;
   controlling automatically, with the set of commands, the first thermal processing device to continue the first food processing step when the temperature characteristic is within a predetermined range associated with the first food processing step; and
   automatically incrementing, with the set of commands, the multi-step process flow to a second food processing step undertaken at a different location when the temperature characteristic is outside of the predetermined tango associated with the first food processing step, while alerting a user with an alarm, and moving the set of wireless probes inserted in the food product to a second thermal processing device when the second food processing step requires a different thermal processing device, wherein the set of commands control the thermal processing devices.

2. The method according to claim 1, wherein the second food processing step is undertaken in a different thermal processing device than the thermal processing device in which the first food processing step occurs.

3. The method according to claim 2, comprising moving the food product and the set of wireless probes to the different thermal processing device when the temperature characteristic is outside of the predetermined range associated with the first food processing step.

4. The method according to claim 3, wherein comprising manually moving the food product and the set of wireless probes to the different thermal processing device.

5. The method according to claim 4, comprising monitoring, with the control panel and wireless probes, the temperature characteristic as the food product is being moved from the thermal processing device to the different thermal processing device.

6. The method according to claim 2, wherein the thermal processing device comprises one of a batch oven, belt oven and chiller and wherein the different thermal processing device comprises another of the batch oven, belt oven, and chiller.

7. The method according to claim 1, comprising completing the second food processing step in the same thermal processing device as where the first food processing step is undertaken.

8. The method according to claim 7, comprising conveying the food product and wireless probes from one location to the different location when the temperature characteristic is outside of the predetermined range associated with the first food processing step.

9. The method according to claim 8, comprising controlling, with the control panel, the speed at which the food product and wireless probes are conveyed from the one location to the different location based upon the temperature characteristic.

10. The method according to claim 8, comprising alerting, with the control panel, a user when the temperature characteristic is outside of the predetermined range.

11. The method according to claim 1, comprising programming, via a graphical interface associated with the control panel, the process flow, wherein the process flow comprises a plurality of steps.

12. The method according to claim 1, comprising displaying on a display screen, a data graph illustrating real time temperature readings from the wireless probes.

13. The method according to claim 1, comprising displaying on a display screen, alarms that will occur in response to the process flow.

\* \* \* \* \*